UNITED STATES PATENT OFFICE.

127,923

WILLIAM WILKSON REEVES, OF BRADDOCK'S FIELD, PENNSYLVANIA.

IMPROVEMENT IN ARTIFICIAL STONE.

Specification forming part of Letters Patent No. 127,923, dated June 11, 1872.

*To all whom it may concern:*

Be it known that I, WILLIAM W. REEVES, of Braddock's Field, in the county of Allegheny and State of Pennsylvania, have invented a new and valuable Improvement in Artificial Stone; and I do hereby declare that the following is a full, clear, and exact description of the construction of the same.

My invention has relation to the production of artificial stone; and the novelty consists in the combination, with cement and sand, of the material known as protosulphide of iron.

In the manufacture of this artificial stone mix about one ounce, more or less, as may be desired, of the protosulphide of iron in a gallon of clean water. Then mix together thoroughly cement and sharp sand, in the proportions of about two parts of the former and one part of the latter. To the cement and sand then add the protosulphide of iron, and mix all well together in the batch, after which the preparation is ready for use, and may be molded into various forms, or spread on the ground as a paving material, or it may be used for any other purpose to which artificial stone is applicable.

Where protosulphide of iron is not available or not desirable sulphite of iron may be substituted.

What I claim as my invention, and desire to secure by Letters Patent, is—

The combination, with cement and sand, of protosulphide of iron or its equivalent, to produce artificial stone, substantially as specified.

In testimony that I claim the above I have hereunto subscribed my name in the presence of two witnesses.

WILLIAM WILKSON REEVES.

Witnesses:
J. D. SCHOOLEY,
JAS. A. RUSSELL.